United States Patent [19]

Eger

[11] 4,449,749

[45] May 22, 1984

[54] PASSENGER CAR BODY END WALL

[75] Inventor: Georg Eger, Pleidelsheim, Fed. Rep. of Germany

[73] Assignee: Dr. Ing. h.c.F. Porsche AG, Fed. Rep. of Germany

[21] Appl. No.: 361,796

[22] Filed: Mar. 25, 1982

[30] Foreign Application Priority Data

Apr. 9, 1981 [DE] Fed. Rep. of Germany ....... 3114415

[51] Int. Cl.³ .............................................. B62D 31/00
[52] U.S. Cl. .................................... 296/194; 296/198; 296/30
[58] Field of Search .............. 296/185, 187, 188, 191, 296/192, 194, 198, 196, 197, 29, 30

[56] References Cited

U.S. PATENT DOCUMENTS

| | | | |
|---|---|---|---|
| 2,715,448 | 8/1955 | Zeeb | 296/194 |
| 2,955,870 | 10/1960 | Richards | 296/194 |
| 3,086,606 | 4/1963 | Schwiering | 296/194 |
| 3,295,627 | 1/1967 | Fleck et al. | 296/194 |

*Primary Examiner*—Robert R. Song
*Attorney, Agent, or Firm*—Craig & Burns

[57] ABSTRACT

A passenger car is provided with a body wall which preferably limits the engine space and consists of a frame system comprising an upper transverse member and a lower transverse member, the frame system being attached to fender walls and longitudinal supports. To attach unit mounts to the body end wall and satisfactorily absorb and transmit loads to the fender walls or the longitudinal supports, the frame system comprises an upper transverse member, a lower transverse member, and flanged vertical metal plates joined to a transverse wall at a distance from the median longitudinal plane of the vehicle, and the lower transverse member is connected by reinforcing elements to the higher level longitudinal supports of the fender walls.

15 Claims, 4 Drawing Figures

PASSENGER CAR BODY END WALL

BACKGROUND AND SUMMARY OF THE INVENTION

The invention relates to a passenger car body end wall that extends perpendicularly to the direction of vehicle travel, which preferably bounds the engine space, and comprises a frame system having an upper transverse member and a lower transverse member that is attached to fender walls and longitudinal supports of the car body.

In a known body end wall (British Pat. No. 853,432), transverse members are arranged on lateral vertical posts and attached to the fender walls. In this structure, lower transverse supports and longitudinal supports of the fender walls are located approximately at the same height, so that the functional arrangement of the bumper and/or unit mounts (for the engine, wheel steering members, etc.) is not possible. In this case, the longitudinal support would extend at the level of a bumper shock damper, so that complicated heavy supporting means would have to be provided. Besides, no provisions are made in the unit mounts on the lower transverse supports to transmit loads effectively to the longitudinal supports or the fender walls.

A principal object of the invention is, therefore, to provide a lightweight passenger car body end wall which can be easily manufactured, accommodate components of the body and assemblies, and absorb loads functionally, transferring them to the fender walls or longitudinal supports.

According to a preferred embodiment of the invention, this object is achieved by providing a frame system which comprises upper and lower transverse members which are mounted higher and lower than said longitudinal supports, respectively, and flanged vertical metal plates joined to the transverse wall at a distance from the median longitudinal plane of the car, and the lower transverse member is connected by reinforcing elements to the longitudinal supports of the fender walls.

Principal advantages obtained from the invention are that a bumper, units such as wheel steering elements, and a preferably transversely mounted power plant can be attached to the body end wall, since the loads (braking, acceleration, torsion, bending) are satisfactorily absorbed and transmitted to the bumper walls or longitudinal supports. These conditions result from the transverse supports and their connection to the transverse wall and flanged metal plates, and from the transition between the structure and the fender walls.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
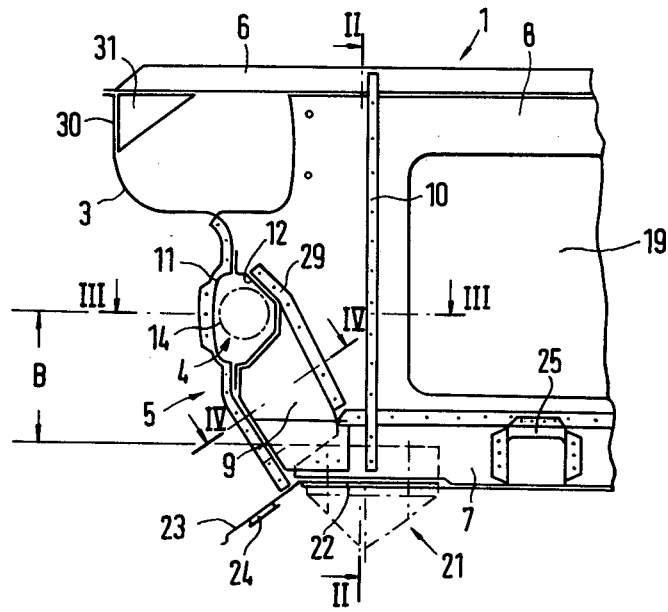
FIG. 1 is a partial front view of a passenger car body end wall.
Figure 2:
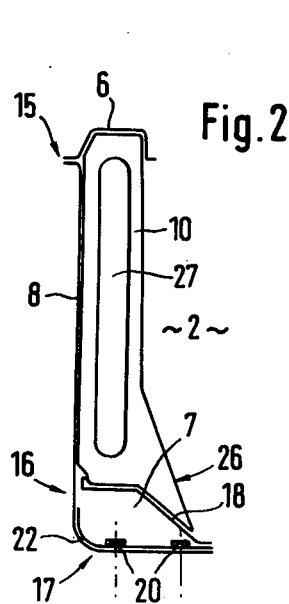
FIG. 2 is a section along line II—II in FIG. 1.
Figure 3:
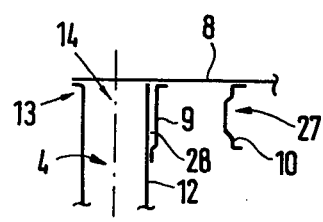
FIG. 3 is a section along line III—III in FIG. 1.
Figure 4:
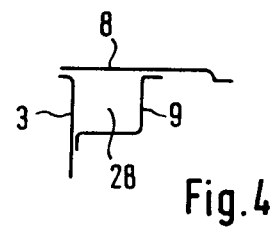
FIG. 4 is a section along line IV—IV in FIG. 1.

FIG. 1 shows a passenger car body end wall 1 extending generally perpendicularly to the longitudinal axis of the vehicle, which preferably bounds an engine space 2. Body end wall 1 is attached to the opposite fender walls 3 and longitudinal supports 4 (of which only those at one side of the vehicle are illustrated). A frame system 5 comprises an upper transverse member 6, a lower transverse member 7, a transverse wall 8, reinforcing elements 9, and flanged metal plates 10.

Each longitudinal support 4 is formed by an extension 11 of fender walls 3 and an end portion 12. The free end 13 of support 4 is provided with holders 14 (schematically represented) for the shock dampers of a bumper. Longitudinal support 4 is located above, and separated by a distance B from lower transverse member 7. Transverse wall 8 connects upper transverse member 6 to lower transverse member 7, and also the two fender walls 3 on opposite sides of the car body. Transverse wall 8 and upper transverse member 6 are interconnected by a substantially horizontal flange 15. The lower end 16 of transverse wall 8 is provided with a bent portion 17 which, together with an angle element 18, forms lower transverse member 7. In the region of the engine radiator (not shown) transverse wall 8 is provided with an air supply opening 19.

Holders 20 for unit mounts 21 (e.g., for the front wheel spindle steering arm and engine mount) include threaded sockets, welding bolts, or the like, and are provided with reinforcing elements 22 at each unit mount 21. Reinforcing element 22 extends into transverse member 7, and, outside of said member 7, has an angled extension 23 integrated with a towing ring 24.

Satisfactory transmission of forces to body end wall 1 results from the provision of flanged vertical metal plates 10 mounted on transverse wall 8 near unit mount 21 at a distance from the median longitudinal plane of the vehicle, and connecting upper transverse member 6 to lower transverse member 7. The embodiment provides for two flanged metal plates 10, but an additional number of such plates 10 may be arranged near an engine mount 25. Each flanged metal plate 10 is preferably enveloped by upper transverse member 6, open at the bottom, and placed on the angle element 18 of lower transverse member 7. In the region of angle element 18, flanged metal plate 10 is provided with a downwardly narrowing extension 26. Metal plate 10 also has a shaped portion 27 to increase its rigidity.

To transmit the forces from lower transverse member 7 to the longitudinal support 4, a reinforcing element 9 is provided and forms a hollow space 28 with transverse wall 8, fender wall 3, and longitudinal support 4. Reinforcing element 9 is connected so that its end portion 29 at least partially envelops longitudinal support 4.

A junction plate 31 is provided for reinforcement between transverse member 6 and a vertical portion 30 of each fender wall 3.

In the illustrated embodiment, the body end wall 1 of the invention is designed as a front end unit in a passenger car, but it may be used also as a rear end unit.

While I have shown and described a single embodiment in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A car body end wall, extending generally perpendicularly to the direction of vehicle travel, having a transverse wall interconnecting fenders of the car and attached to fender walls and longitudinal supports of the fenders; comprising a frame system including upper and lower transverse members which are mounted higher and lower than said longitudinal supports, respectively, plate means flanged and disposed vertically at a distance from the median longitudinal plane of the car body for joining the upper and lower transverse members and the transverse wall, said plate means extending in the longitudinal direction of the vehicle and having rigidifying shaped portions, and reinforcing means for connecting the lower transverse member to the longitudinal supports.

2. A body end wall according to claim 1, wherein said plate means includes a plurality of metal plates wherein each plate has a downwardly narrowing extension near the lower transverse member.

3. A body end wall according to claim 1, wherein said plate means includes a plurality of metal plates, each flanged metal plate extends into a region of the lower transverse member adapted to have a unit mount.

4. A body end wall according to claim 1, wherein the transverse wall interconnecting the fenders is attached by a flange to the upper transverse member and, near the lower transverse member, is provided with a bent portion that forms a part of said lower transverse member.

5. A body end wall according to claim 1, wherein said reinforcing means includes a plurality of reinforcing elements, each of the elements encloses a hollow space together with the transverse wall, a fender wall, and a longitudinal support.

6. A body end wall according to claim 1, wherein said reinforcing means includes a plurality of reinforcing elements, one end portion of each of said reinforcing elements extends at least partially around a respective longitudinal support.

7. A body end wall according to claim 3, wherein a reinforcing element is provided at each unit mount and has an extension including a towing ring.

8. A body end wall according to claim 1, wherein a junction plate is provided between the upper transverse member and a vertical portion of a fender wall of each fender.

9. A body end wall according to claim 8, wherein the transverse wall interconnecting the fenders is attached by a flange to the upper transverse member and, near the lower transverse member, is provided with a bent portion that forms a part of said lower transverse member.

10. A body end wall according to claim 9, wherein a reinforcing element is provided at each unit mount and has an extension including a towing ring.

11. A body end wall according to claim 1, wherein said transverse wall is a wall of an engine compartment of the car.

12. A body end wall according to claim 11, wherein the end wall is provided with unit mounts for wheel steering elements, bumper shock dampers and a transversely mounted engine.

13. A body end wall according to claim 4, wherein said transverse wall is a wall of an engine compartment of the car and a plurality of unit mounts are attached to the body end wall for supporting steering elements, bumper shock dampers and an engine of the car.

14. A car body end wall, extending generally perpendicularly to the direction of vehicle travel, having a transverse wall interconnecting fenders of the car and attached to fender walls and longitudinal supports of the fenders; comprising a frame system including upper and lower transverse members which are mounted higher and lower than said longitudinal supports, respectively, plate means flanged and disposed vertically at a distance from the median longitudinal plane of the car body for joining the upper and lower transverse members and the transverse wall, wherein said plate means includes a plurality of metal plates, each flanged metal plate extends into a region of the lower transverse member adapted to have a unit mount and reinforcing means for connecting the lower transverse member to the longitudinal supports.

15. A car body end wall, extending generally perpendicularly to the direction of vehicle travel, having a transverse wall interconnecting fenders of the car and attached to fender walls and longitudinal supports of the fenders; comprising a frame system including upper and lower transverse members which are mounted higher and lower than said longitudinal supports, respectively, plate means flanged and disposed vertically at a distance from the median longitudinal plane of the car body for joining the upper and lower transverse members and the transverse wall, and reinforcing means for connecting the lower transverse member to the longitudinal supports of the fenders, wherein said reinforcing means includes a plurality of reinforcing elements, each of the elements encloses a hollow space together with the transverse wall, a fender wall, and a longitudinal support.

* * * * *